(12) United States Patent
Sawhney et al.

(10) Patent No.: US 9,485,692 B2
(45) Date of Patent: Nov. 1, 2016

(54) LTE HANDOVER PARAMETER CONFIGURATION FOR SPECIFIC TYPES OF TRAFFIC

(71) Applicant: QUALCOMM Incorporated, San Diego, CA (US)

(72) Inventors: Salil Sawhney, San Diego, CA (US); Mouaffac Ambriss, San Diego, CA (US); Mutaz Zuhier Afif Shukair, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/473,429

(22) Filed: Aug. 29, 2014

(65) Prior Publication Data

US 2016/0066223 A1 Mar. 3, 2016

(51) Int. Cl.
*H04W 36/00* (2009.01)
*H04W 36/24* (2009.01)

(52) U.S. Cl.
CPC ......... *H04W 36/0083* (2013.01); *H04W 36/24* (2013.01)

(58) Field of Classification Search
CPC ........................ H04W 36/0083; H04W 36/24
USPC ........................................................ 455/436
See application file for complete search history.

(56) References Cited

U.S. PATENT DOCUMENTS

| | | |
|---|---|---|
| 2005/0215254 A1 | 9/2005 | Pedersen et al. |
| 2013/0089033 A1 | 4/2013 | Kahn et al. |
| 2014/0029580 A1 | 1/2014 | Jung et al. |
| 2014/0045500 A1 | 2/2014 | Dimou et al. |
| 2014/0064156 A1 | 3/2014 | Paladugu et al. |
| 2014/0105059 A1 | 4/2014 | Chandhuri et al. |
| 2014/0128075 A1 | 5/2014 | Da Silva et al. |

FOREIGN PATENT DOCUMENTS

| | | |
|---|---|---|
| EP | 2869634 A1 | 5/2015 |
| WO | WO-2008037552 A1 | 4/2008 |
| WO | WO-2014002321 A1 | 1/2014 |

OTHER PUBLICATIONS

ISA/EPO, International Search Report and Written Opinion of the International Searching Authority, Int'l. App. No. PCT/US2015/043773, Oct. 28, 2015, European Patent Office, Rijswijk, NL, 14 pgs.

*Primary Examiner* — Nader Bolourchi
(74) *Attorney, Agent, or Firm* — Holland and Hart LLP

(57) ABSTRACT

Methods, systems, and devices are described for wireless communication at a base station. A base station may identify a service type of a mobile device (e.g., voice, web-browsing, or video download). The base station may then determine handover or measurement parameters for the mobile device based on the service type. The base station may also determine a performance metric of the service type. The base station may then adjust the set of parameters based at least in part on the performance metric. In some cases, the base station may select a measurement configuration based on the adjusted parameters.

28 Claims, 13 Drawing Sheets

LTE HANDOVER PARAMETER CONFIGURATION FOR SPECIFIC TYPES OF TRAFFIC

FIELD OF DISCLOSURE

The following relates generally to wireless communication, and more specifically to LTE handover parameter configuration for specific types of traffic.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system.

By way of example, a wireless multiple-access communications system may include a number of base stations, each simultaneously supporting communication for multiple communication devices, which may be otherwise known as a user equipment (UE). A base station may communicate with UEs on downlink channels (e.g., for transmissions from a base station to a UE) and uplink channels (e.g., for transmissions from a UE to a base station).

In some cases, a UE may move from the coverage area of one (source) base station to the coverage area of a different (target) base station. The UE and the two base station may then coordinate to perform a handover procedure. The handover procedure may depend on parameters, e.g., parameters of the source base station, the UE, or the core network. Using the same handover parameters regardless of the type of data traffic (e.g., voice, web-browsing, or video download) may result in degradation of service quality for one or more of the traffic types during handover.

SUMMARY

The present disclosure may relate generally to wireless communication systems, and more particularly to one or more improved systems, methods, and/or apparatuses for Long Term Evolution (LTE) handover parameter configuration for specific types of traffic. A base station may identify a service type of a mobile device (e.g., voice, web-browsing, or video download). The base station may then determine handover or measurement parameters for the mobile device based on the service type. The base station may also determine a performance metric of the service type. The base station may then adjust the set of parameters based at least in part on the performance metric. In some cases, the base station may select a measurement configuration based on the adjusted parameters.

A method of LTE handover parameter configuration for specific types of traffic is described. The method may include identifying a service type of a mobile device, determining a set of parameters for the mobile device based at least in part on the service type, wherein the set of parameters comprises measurement parameters or handover parameters, determining a performance metric of the service type, and adjusting the set of parameters based at least in part on the performance metric.

An apparatus for LTE handover parameter configuration for specific types of traffic is described. The apparatus may include means for identifying a service type of a mobile device, means for determining a set of parameters for the mobile device based at least in part on the service type, wherein the set of parameters comprises measurement parameters or handover parameters, means for determining a performance metric of the service type, and means for adjusting the set of parameters based at least in part on the performance metric.

An apparatus for LTE handover parameter configuration for specific types of traffic is described. The apparatus may include a processor, memory in electronic communication with the processor, and instructions stored in the memory, wherein the instructions are executable by the processor to identify a service type of a mobile device, determine a set of parameters for the mobile device based at least in part on the service type, wherein the set of parameters comprises measurement parameters or handover parameters, determine a performance metric of the service type, and adjust the set of parameters based at least in part on the performance metric.

A non-transitory computer-readable medium storing code for LTE handover parameter configuration for specific types of traffic is also described. The code may include instructions executable by a processor to identify a service type of a mobile device, determine a set of parameters for the mobile device based at least in part on the service type, wherein the set of parameters comprises measurement parameters or handover parameters, determine a performance metric of the service type, and adjust the set of parameters based at least in part on the performance metric.

Some examples of the method, apparatuses, and/or non-transitory computer-readable medium described above may further include selecting a measurement configuration based on the adjusted set of parameters. Some examples may include excluding a parameter from the measurement configuration based on the performance metric.

Some examples of the method, apparatuses, and/or non-transitory computer-readable medium described above may further include selecting a handover target based on the performance metric. Some examples may include identifying a number of services supported by a base station associated with the handover parameters.

In some examples of the method, apparatuses, and/or non-transitory computer-readable medium described above adjusting the set of handover parameters comprises adjusting the set of handover parameters based at least in part of the performance metric and the number of services supported by the base station. Some examples may include identifying a number of services supported by the mobile device.

In some examples of the method, apparatuses, and/or non-transitory computer-readable medium described above adjusting the set of handover parameters comprises adjusting the set of handover parameters based at least in part of the performance metric and the number of services supported by the mobile device. Some examples may include identifying a number of characteristics of the mobile device.

Some examples of the method, apparatuses, and/or non-transitory computer-readable medium described above may further include determining a network performance associated with the number of characteristics of the mobile device. In some examples adjusting the set of handover parameters comprises adjusting the set of handover parameters based at least in part of the performance metric and the number of characteristics of the mobile device.

In some examples of the method, apparatuses, and/or non-transitory computer-readable medium described above the characteristics of the mobile device comprise a mobile device model. In some examples the service type comprises a quality of service (QoS) class identifier (QCI).

In some examples of the method, apparatuses, and/or non-transitory computer-readable medium described above the performance metric comprises at least one of intra-frequency handover counts, inter-frequency handover counts, ping-pongs, inter radio access technology (RAT) triggers, single radio voice call continuity (SR-VCC) triggers, radio resource control (RRC) connection reestablishment occurrences, robust header compression (RoHC) related efficiency, RoHC related mode changes, block error rate (BLER), physical downlink shared channel (PDSCH)/physical uplink shared channel (PUSCH) resource block utilization, physical downlink control channel (PDCCH) utilization, a number of users per service type or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
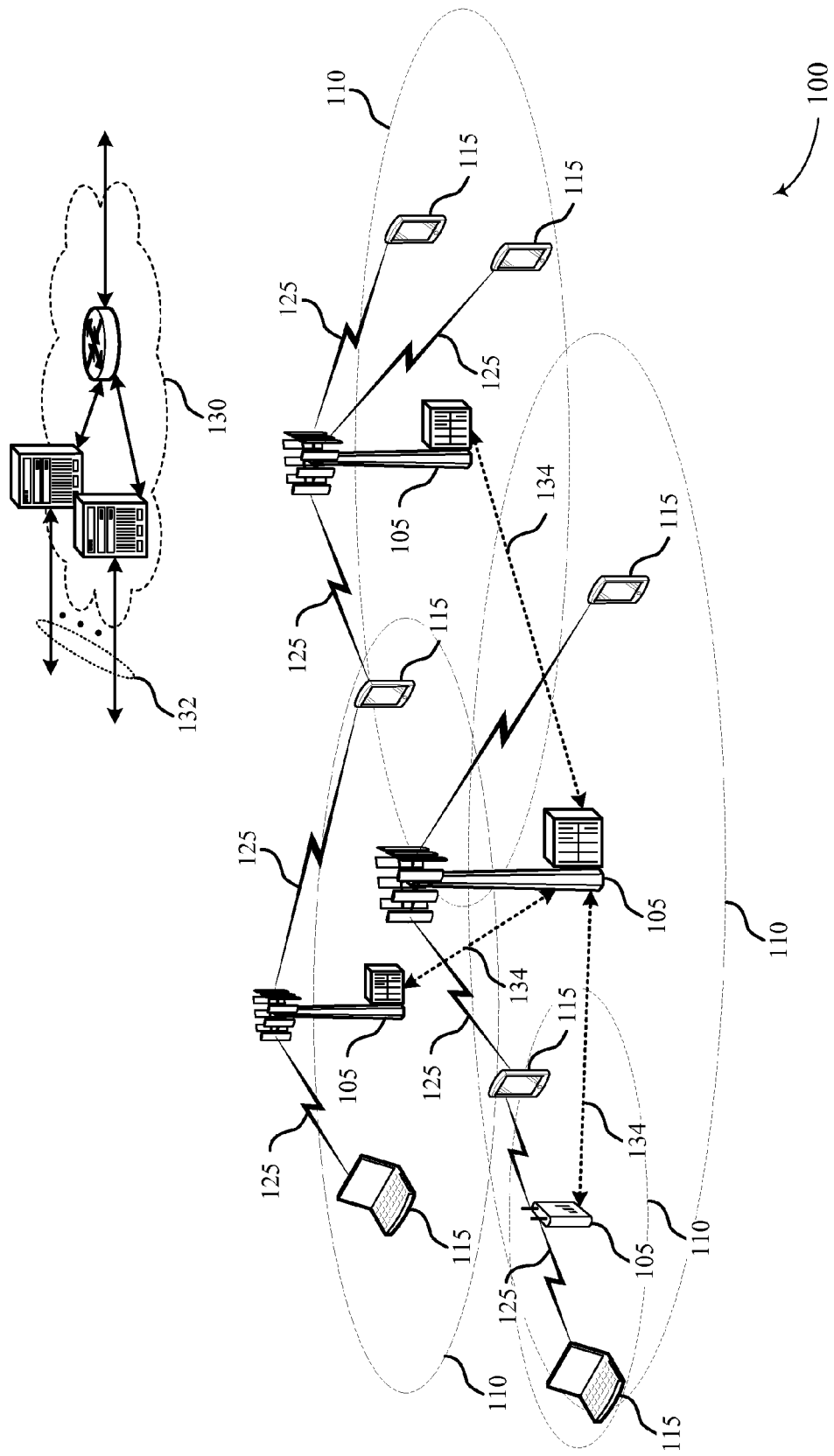
FIG. 1 illustrates an example of a wireless communications system in accordance with various aspects of the present disclosure.

The described features generally relate to one or more improved systems, methods, and/or apparatuses for Long Term Evolution (LTE) handover parameter configuration for specific types of traffic. A base station may identify a service type of a mobile device (e.g., voice, web-browsing, or video download). The base station may then determine handover or measurement parameters for the mobile device based on the service type. The base station may also determine a performance metric of the service type. The base station may then adjust the set of parameters based at least in part on the performance metric. In some cases, the base station may select a measurement configuration based on the adjusted parameters.

Using the same handover parameters regardless of the type of data traffic (e.g., voice, web-browsing, or video download) may result in degradation of service quality for one or more of the traffic types during handover. According to the present disclosure, it may be beneficial to set appropriate handover parameters based on the traffic quality of service (QoS) settings, and adapt the parameter settings based on network performance statistics.

Thus, a base station or a mobile device may select a specific set of handover parameter values to improve the mobility of a user device (UE) supporting certain services or applications. This may enhance the overall user experience. The selection of parameters may be done based on the type of traffic, and may reduce the chance of delayed handover that can negatively affect the chosen traffic type, e.g. for voice over LTE (VoLTE) service. In addition, the handover parameter settings may be determined based on specific features supported by a base station (e.g., transmission time interval (TTI) bundling, or robust header compression (RoHC), etc.) and may be further updated based on current performance metric data related to similar traffic types.

Selecting handover parameters based on traffic types may improve handover decisions, thereby providing a better user experience and improved QoS (e.g., packet loss, delay, throughput). Adaptive handover configuration as described in the present disclosure may also result in reduced signaling (e.g., due to unnecessary measurement reports and configurations). In some cases, it may also result in improved network resource utilization or improved LTE radio resource, core network component, and UE processor utilization.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, at least one user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies In some examples, the wireless communications system 100 is an LTE/LTE-A network. In LTE/LTE-A networks, the term evolved node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to Physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation carrier aggregation (CA) or multi-carrier operation. A carrier may also be referred to as a component carrier CC, a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

UEs 115 may move from one coverage area 110 to another, and the communication link 125 of the UE 115 may be changed from one base station 105 to another. The transition from one base station 105 to another may be known as a handover. A handover may be based on a set of parameters that may be measured by the base station. For example, it may be based on signal strength, signal quality, network load, traffic patterns, etc. According to the present disclosure, handover parameters may be based on the traffic type of the UE 115 (e.g., voice, web-browsing, or video download).

Thus, a base station may identify a service type of a mobile device. The base station may then determine handover or measurement parameters for the mobile device based on the service type. The base station may also determine a performance metric of the service type. The base station may then adjust the set of parameters based at least in part on the performance metric.

Figure 2:
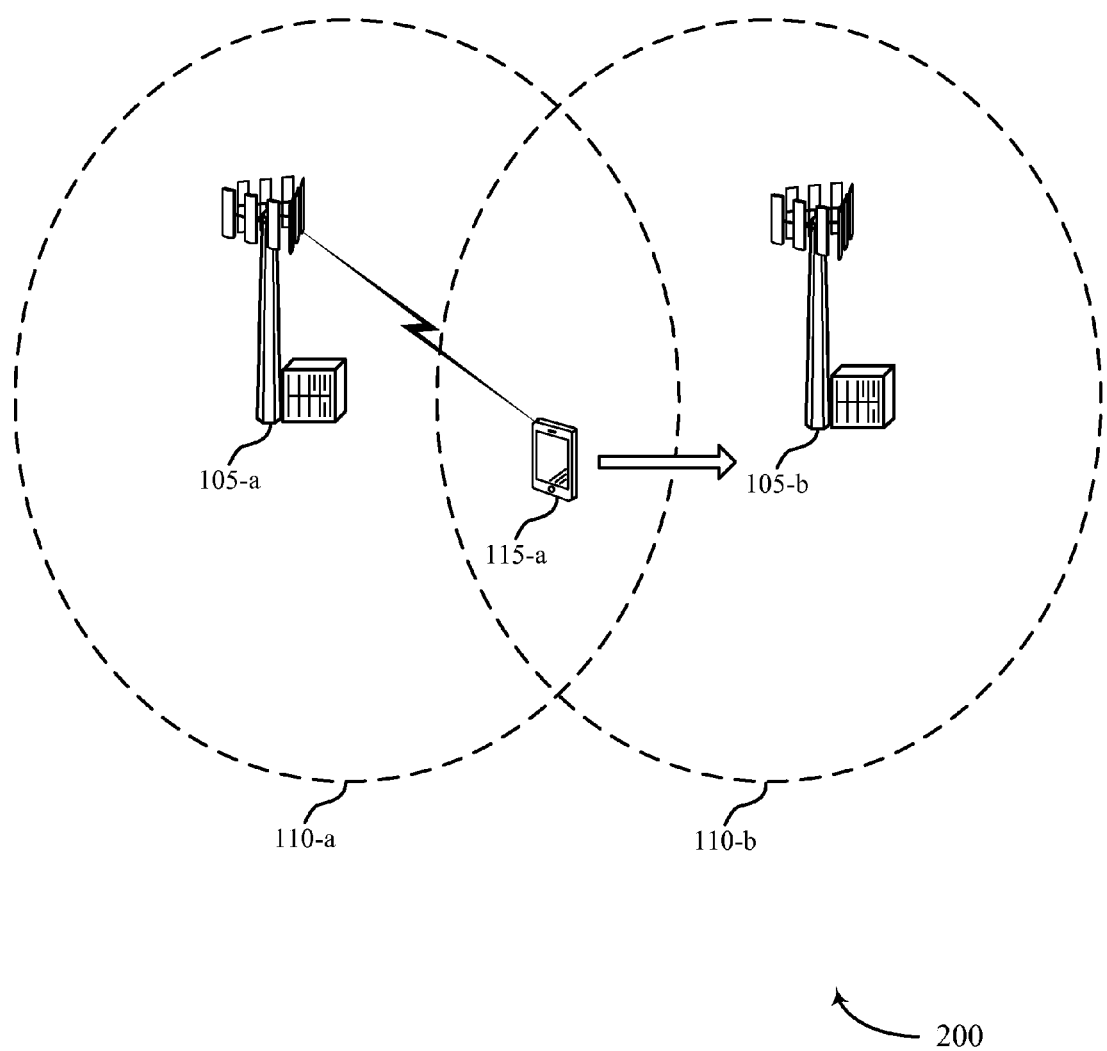
FIG. 2 illustrates an example of a wireless communication system for LTE handover parameter configuration for specific types of traffic in accordance with various aspects of the present disclosure.

FIG. 2 illustrates an example of a wireless communication system 200 for LTE handover parameter configuration for specific types of traffic in accordance with various aspects of the present disclosure. Wireless communication system 200 may include a source base station 105-a with coverage area 110-a and a UE 115-a that is connected to a wireless network via source base station 105-a.

UEs 115-a may be moving from one coverage area 110-a of source base station 105-a to coverage area 110-b of a target base station 105-b. The source base station 105-a may direct the UE 115-a to make one or more measurements related to the signal that may be received by the UE 115-a from the target base station 105-b. The measurements may be reported via RRC signaling to source base station 105-a. In some cases (e.g., when the UE 115-a is in an active state) the source base station 105-a may determine when it is appropriate to initiate a handover based on the measurements received from UE 115-a. In other cases, a UE 115 may determine when to initiate the handover.

When a handover is initiated, the source base station 105-a may send a handover request message to target base station 105-b, for example, via an X2 backhaul link. This message may indicate at least one target cell of the target base station 105-b, a current serving mobility management entity (MME), and current a serving gateway (S-GW).

The target base station 105-b may then allocate capacity in the target cell for the incoming UE 115-a. After the target base station has allocated capacity, it may respond to the source base station 105-a with a handover request acknowledge message. The acknowledge message may also indicate a data forwarding tunnel for buffered data packets stored at the source base station 105-a to be forwarded to the target base station 105-b.

The source base station 105-a may then send a handover command via RRC signaling to the UE 115-a. The handover command may contain a configuration for the UE 115-a in the target cell of the target base station 105-b. The UE 115-a may then detach from the serving cell(s) of the source base station 105-a and begin synchronization with the target cell of the target base station 105-b. Once synchronization is achieved, the UE 115-a may confirm the handover with a handover confirm message to the target base station 105-b, which may trigger a handover complete message to be sent to the serving MME via an S1 interface.

According to the present disclosure, a handover may be based on the traffic type of the UE 115 (e.g., voice, web-browsing, or video download). Thus, a base station may identify a service type of a mobile device. The base station may then determine handover or measurement parameters for the mobile device based on the service type. The base station may also determine a performance metric of the service type. The base station may then adjust the set of parameters based at least in part on the performance metric.

A base station may identify a service type of a mobile device, and determine handover or measurement parameters for the mobile device based on the service type. The base station may also determine a performance metric of the service type. The base station may then adjust the set of parameters based at least in part on the performance metric.

Figure 3:
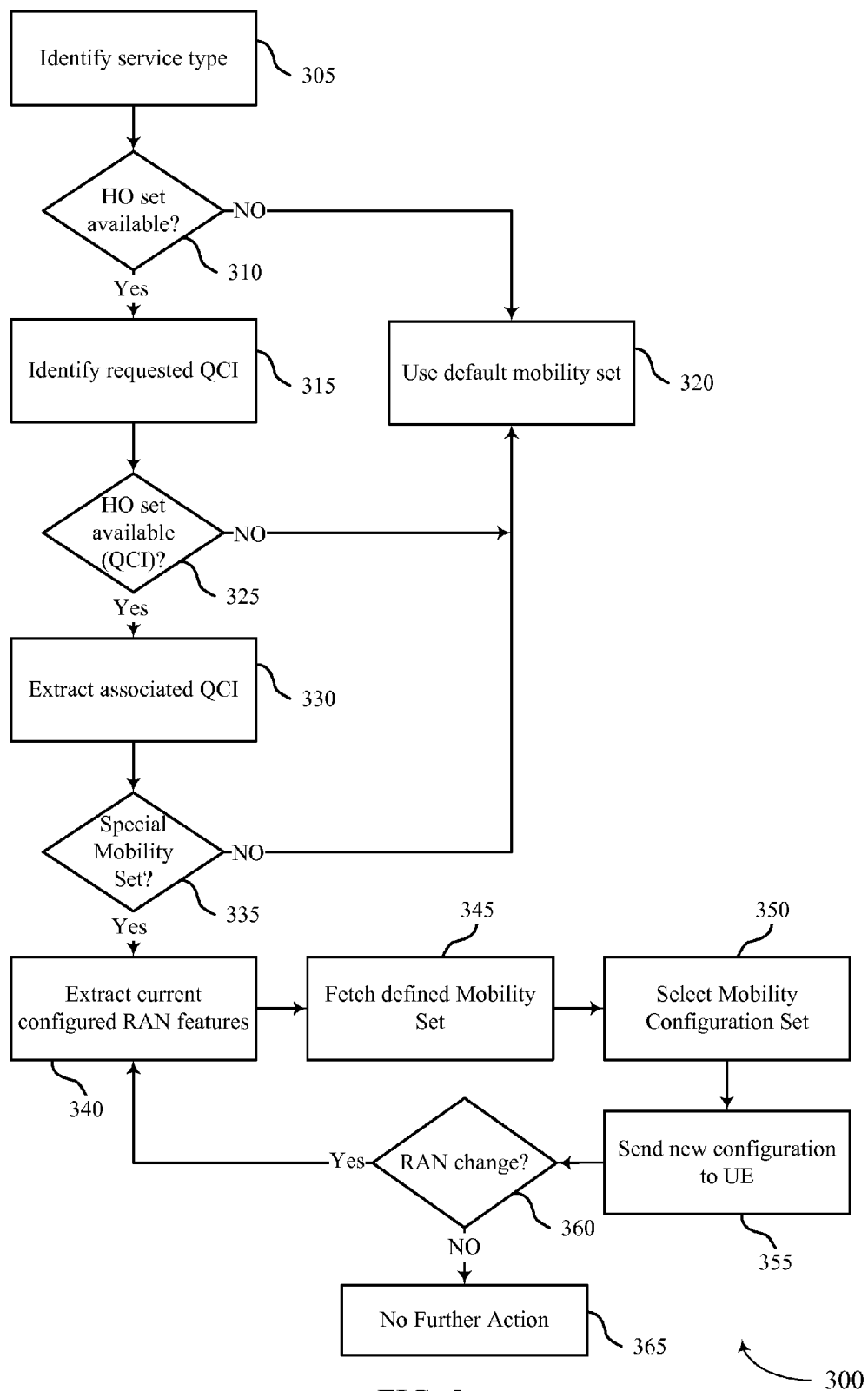
FIG. 3 shows a flowchart illustrating a method for LTE handover parameter configuration for specific types of traffic in accordance with various aspects of the present disclosure.

FIG. 3 shows a flowchart illustrating a method 300 for LTE handover parameter configuration for specific types of traffic in accordance with various aspects of the present disclosure. The operations of method 300 may be performed by a wireless communication device, such as a base station 105, or a UE 115 as described above with reference to FIGS. 1-2. A UE 115 may also be referred to as a mobile device. For clarity, the following steps are described as performed by a base station 105, but they may also be performed by another suitable wireless device.

At block 305, a base station 105 may identify a service type of a mobile device. The operations of block 305 (and the ensuing operations of method 300) may be triggered by RRC signaling, the establishment of QoS class identifier (QCI) parameters by a mobile device, IP multimedia subsystem (IMS) signaling, or another indication that adapting handover parameters would be appropriate.

At block 310, the base station 105 may determine whether a special set of handover (or measurement) parameters are available that are associated with this service. Thus, the base station 105 may determine a set of handover or measurement parameters for the mobile device based on the service type, wherein the set of parameters includes measurement parameters or handover parameters.

If a special set of parameters for the service type is available, at block 315, the base station 105 may request QCI. The base station 105 may also determine a performance metric of the service type. In some examples the service type includes the QCI. In some examples the performance metric includes a of intra-frequency handover counts, inter-frequency handover counts, ping-pongs, inter radio access technology (RAT) triggers, single radio voice call continuity (SR-VCC) triggers, RRC connection reestablishment occurrences, robust header compression (RoHC) related efficiency, RoHC related mode changes, block error rate (BLER), physical downlink shared channel (PDSCH)/physical uplink shared channel (PUSCH) resource block utilization, physical downlink control channel (PDCCH) utilization, a number of users per service type or a combination thereof. Services associated with a special mobility configuration may be defined based on a requested QCI or on other negotiated parameters. At block 325, the base station 105 may determine whether a special mobility set is available for the identified performance metric (such as the QCI). If a special set of parameters is not available for the service type, at block 320, the base station 105 may select a default set of mobility parameters. Thus, the base station 105 may adjust the set of parameters based at least in part on the performance metric.

At block 330, the base station 105 may extract an associated QCI. Then, at block 335, the base station 105 may determine whether a special mobility set is associated with the extracted QCI. If a special set of parameters is not associated with the extracted QCI, at block 320, the base station 105 may select a default set of mobility parameters.

If a special mobility set is associated with the extracted QCI, at block 340, the base station 105 may extract a current set of configured RAN parameters. For example, the base station may determine whether features such as semi-persistent scheduling (SPS), transmission time interval (TTI) bundling, RoHC, contention free handover, or contention based handover are enabled. This may allow the base station 105 to run the algorithm in the same market with different configurations. In some cases, different RAN features may be enabled or disabled during a call. Thus, the base station 105 may identify a number of services supported by a base station associated with the handover parameters and adjust the set of handover parameters based at least in part of the performance metric and the number of services supported by the base station. The base station 105 may also identify a number of services supported by the mobile device and adjust the set of handover parameters based at least in part of the performance metric and the number of services supported by the mobile device.

At block 345, the base station 105 may fetch a set of defined mobility sets. Then, at block 350, the base station 105 may select a mobility configuration (e.g., a handover parameter set). Thus, the base station 105 may select a measurement configuration based on the adjusted set of parameters and/or based on the performance metric. In some cases, the base station 105 may exclude a parameter from the measurement configuration based on the performance metric. The base station 105 may also identify a number of characteristics of the mobile device (e.g., a model number of the mobile device), and adjust the parameter according the characteristics. At block 355, the base station 105 may send the new configuration to the UE 115.

At block 360, the base station 105 (in coordination with the UE 115) may determine whether the RAN configuration has changed. If not, at block 365 the algorithm may terminate with no further action. If the RAN configuration has changed, the base station 105 may repeat a portion of the algorithm by proceeding to block 340 to extract the current configured RAN features.

Thus, when a UE 115 starts a specific IMS service, the wireless network may assign a specific set of intra-frequency, inter-frequency, and/or inter-RAT mobility parameters. These parameters may include values assigned for hysteresis, time-to-trigger, threshold reference signal received power (RSRP) values, etc. The parameters may be based, for example, on the QCI value (e.g., QCI 1 may correspond to a voice over LTE (VoLTE) call) which may be associated with specific throughput, latency, and BLER standards that should be met at the handover boundaries without excessive delay. The standards may also include trade-offs based on the number of handovers, DL/UL BLER, and handover ping-gong mitigation procedures.

Thus, as an example of the operation of the algorithm described above, if a user device starts a regular best effort LTE data session, the network may assign a certain group of handover parameters for that traffic type while also considering related base station features and current traffic performance metric inputs. If the user starts a different service such as VoLTE, the network may provide an different set of handover parameters for the new traffic type (e.g., with tighter QoS) and may also base the parameter value decision on specific VoLTE service related features enabled in the network (e.g., TTI bundling, RoHC). Current BLER and delay related performance metrics may also be tracked by the base station 105.

Figure 4:
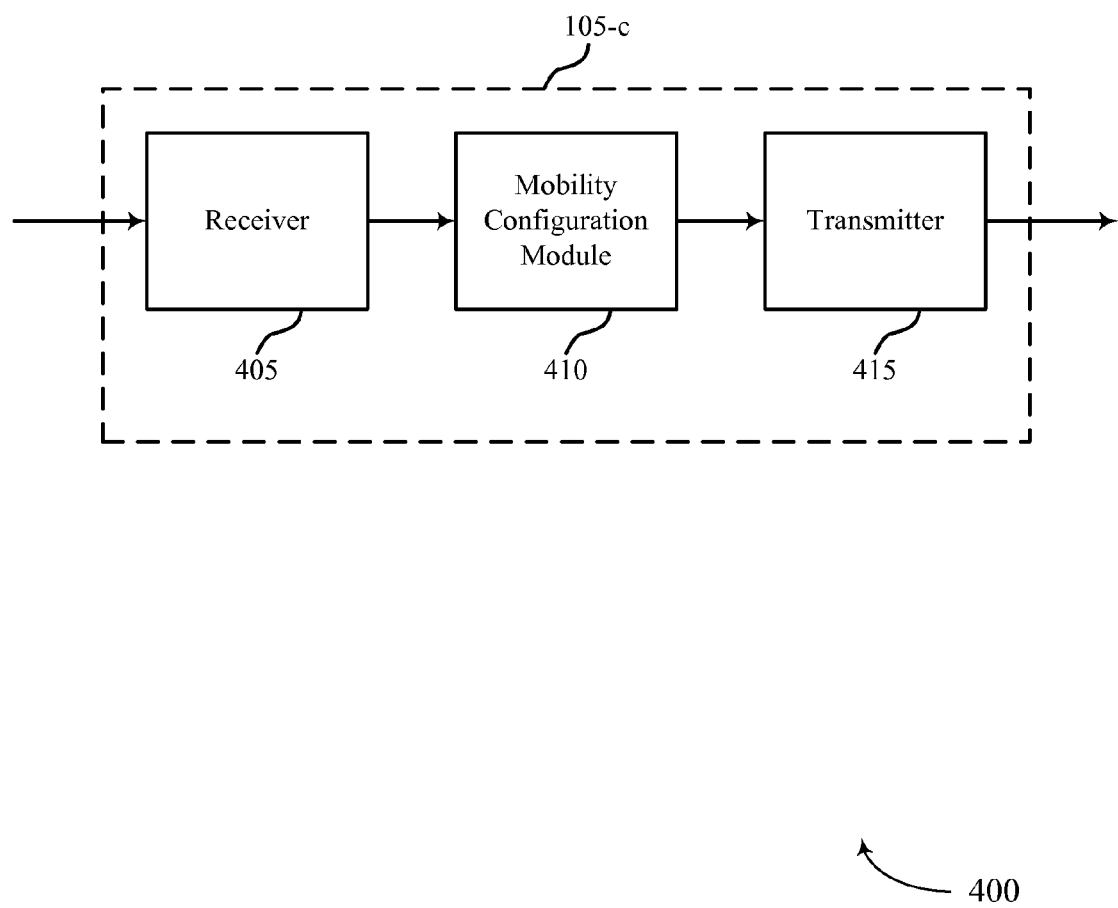
FIG. 4 shows a block diagram of a device for LTE handover parameter configuration for specific types of traffic in accordance with various aspects of the present disclosure.

FIG. 4 shows a block diagram 400 of a base station 105-c for LTE handover parameter configuration for specific types of traffic in accordance with various aspects of the present disclosure. The base station 105-c may be an example of one or more aspects of a base station 105 described with reference to FIGS. 1-3. The base station 105-c may include a receiver 405, a mobility configuration module 410, and/or a transmitter 415. The base station 105-c may also include a processor. Each of these components may be in communication with each other.

The components of the base station 105-c may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another Semi-Custom IC), which may be programmed in any manner known in the art. The functions of each unit may also be implemented, in whole or in part, with instructions embodied in a memory, formatted to be executed by one or more general or application-specific processors.

The receiver 405 may receive information such as packets, user data, and/or control information associated with various information channels (e.g., control channels, data channels, etc.). For example, the receiver 405 may receive indications of service type and signal metrics from a UE 115. Information may be passed on to the mobility configuration module 410, and to other components of the base station 105-c.

The mobility configuration module 410 may identify a service type of a mobile device, and determine a set of parameters for the mobile device based at least in part on the service type, wherein the set of parameters comprises measurement parameters or handover parameters. The mobility configuration module 410 may also determine a performance metric of the service type and may adjust the set of parameters based at least in part on the performance metric.

The transmitter 415 may transmit the one or more signals received from other components of the base station 105-c. For example, the transmitter 415 may transmit a mobility configuration to a UE 115. In some embodiments, the transmitter 415 may be collocated with the receiver 405 in a transceiver module. The transmitter 415 may include a single antenna, or it may include a plurality of antennas.

Figure 5:
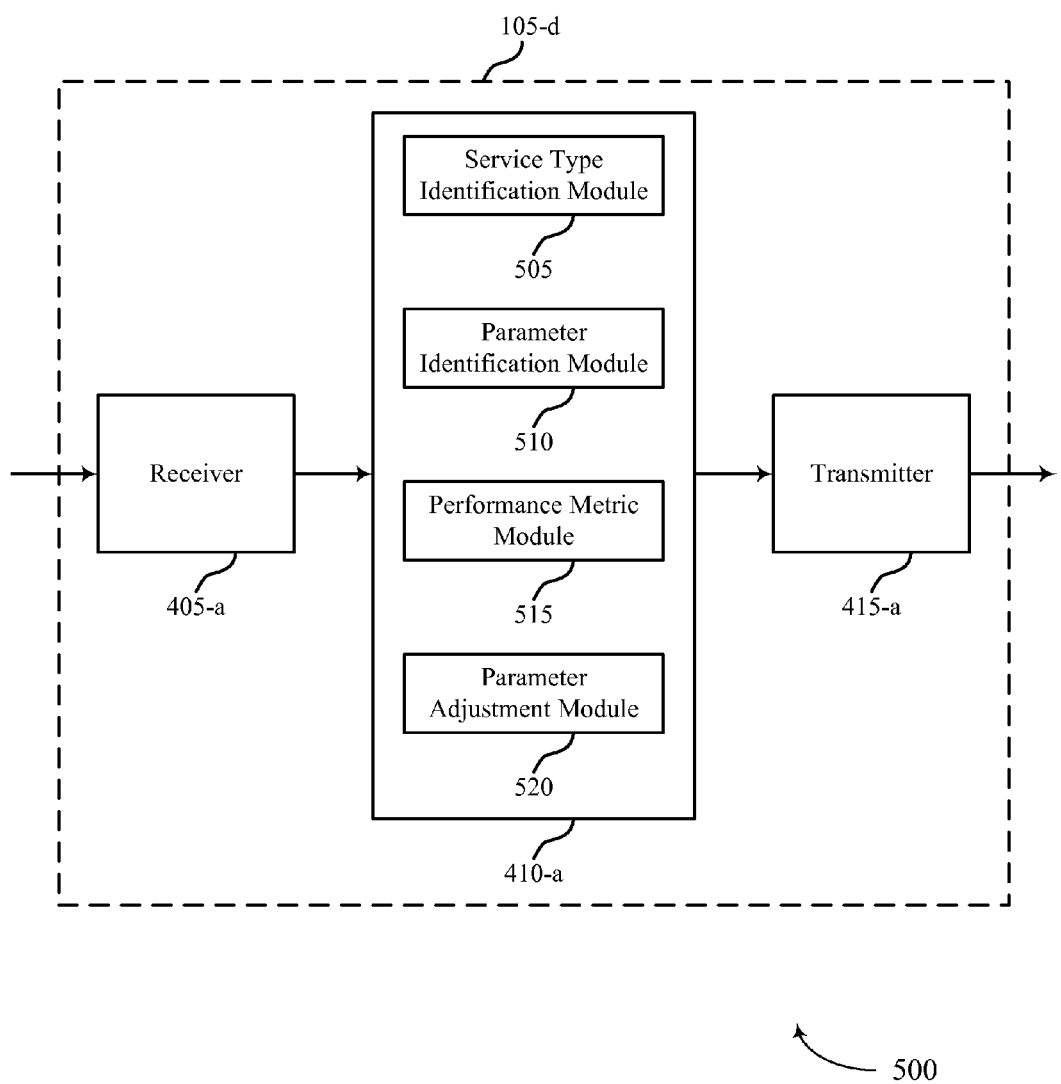
FIG. 5 shows a block diagram of a device for LTE handover parameter configuration for specific types of traffic in accordance with various aspects of the present disclosure.

FIG. 5 shows a block diagram 500 of a base station 105-d for LTE handover parameter configuration for specific types of traffic in accordance with various aspects of the present disclosure. The base station 105-d may be an example of one or more aspects of a base station 105 described with reference to FIGS. 1-4. The base station 105-d may include a receiver 405-a, a mobility configuration module 410-a, and/or a transmitter 415-a. The base station 105-d may also include a processor. Each of these components may be in communication with each other. The mobility configuration module 410-a may also include a service type identification module 505, a parameter identification module 510, a performance metric module 515, and a parameter adjustment module 520.

The components of the base station 105-d may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 405-a may receive information which may be passed on to the mobility configuration module 410-a, and to other components of the base station 105-d. The mobility configuration module 410-a may perform the operations described above with reference to FIG. 4. The transmitter 415-a may transmit the one or more signals received from other components of the base station 105-d.

The service type identification module 505 may identify a service type of a mobile device as described above with reference to FIG. 3. In some examples, the service type comprises a QCI.

The parameter identification module 510 may determine a set of parameters for the mobile device based at least in part on the service type, wherein the set of parameters comprises measurement parameters or handover parameters as described above with reference to FIG. 3.

The performance metric module 515 may determine a performance metric of the service type as described above with reference to FIG. 3. The performance metric module 515 may also determine a network performance associated with the number of characteristics of the mobile device as described above with reference to FIG. 3. In some examples, the performance metric comprises at least one of intra-frequency handover counts, inter-frequency handover counts, ping-pongs, inter RAT triggers, SR-VCC triggers, RRC connection reestablishment occurrences, RoHC related efficiency, RoHC related mode changes, BLER, or a combination thereof.

The parameter adjustment module 520 may adjust the set of parameters based at least in part on the performance metric as described above with reference to FIG. 3. In some examples, adjusting the set of handover parameters comprises adjusting the set of handover parameters based at least in part of the performance metric and the number of services supported by the base station. In some examples, adjusting the set of handover parameters comprises adjusting the set of handover parameters based at least in part of the performance metric and the number of services supported by the mobile device. In some examples, adjusting the set of handover parameters comprises adjusting the set of handover parameters based at least in part of the performance metric and the number of characteristics of the mobile device.

Figure 6:
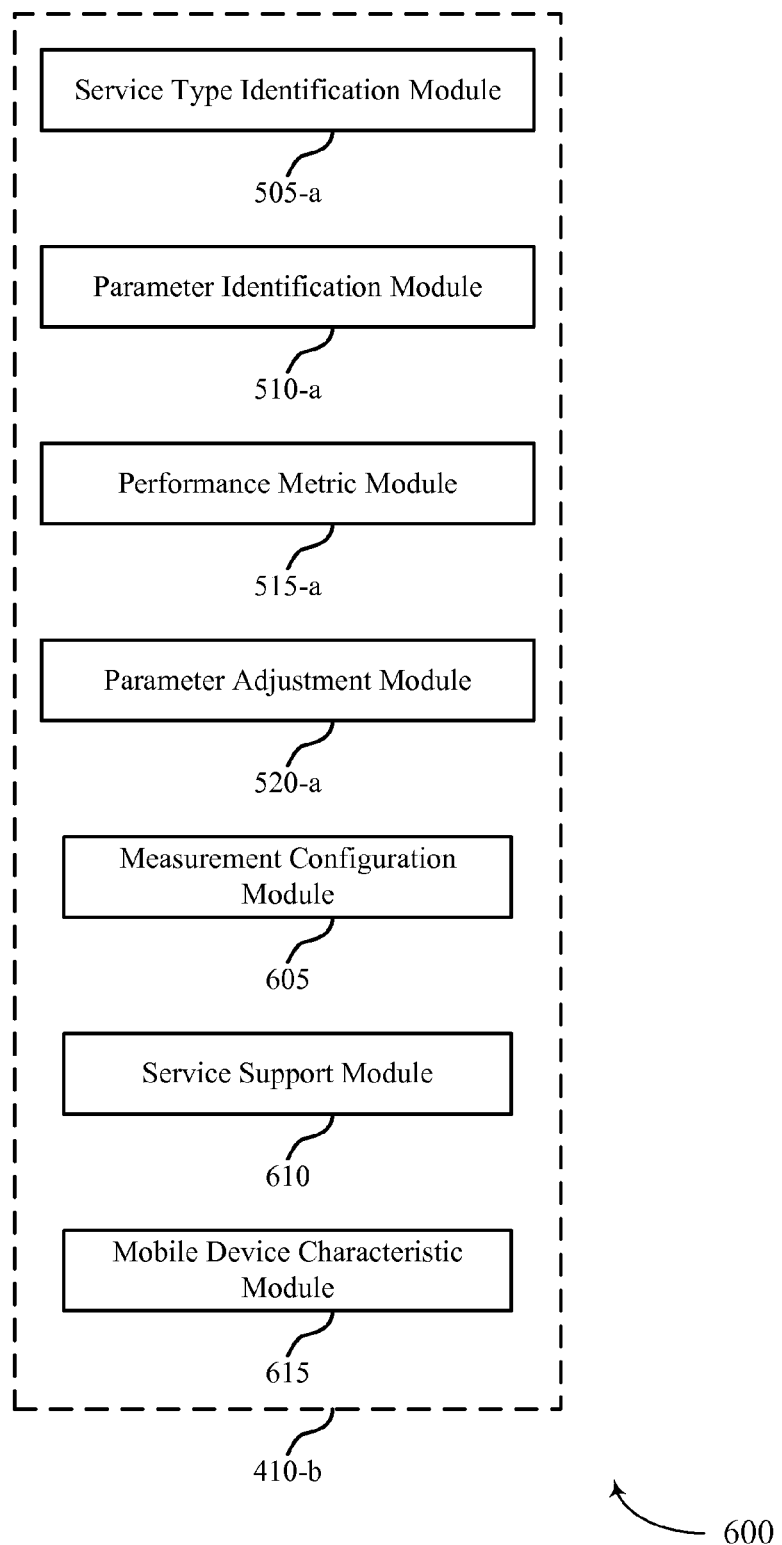
FIG. 6 shows a block diagram of a device for LTE handover parameter configuration for specific types of traffic in accordance with various aspects of the present disclosure.

FIG. 6 shows a block diagram 600 of a mobility configuration module 410-b for LTE handover parameter configuration for specific types of traffic in accordance with various aspects of the present disclosure. The mobility configuration module 410-b may be an example of one or more aspects of a mobility configuration module 410 described with reference to FIGS. 4-6. The mobility configuration module 410-b may include a service type identification module 505-a, a parameter identification module 510-a, a performance metric module 515-a, and a parameter adjustment module 520-a. Each of these modules may perform the functions described above with reference to FIG. 6. The mobility configuration module 410-b may also include a measurement configuration module 605, a service support module 610, and a mobile device characteristic module 615.

The components of the mobility configuration module 410-b may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The measurement configuration module 605 may select a measurement configuration based on the adjusted set of parameters as described above with reference to FIG. 3. The measurement configuration module 605 may also exclude a parameter from the measurement configuration based on the performance metric as described above with reference to FIG. 3.

The service support module 610 may identify a number of services supported by a base station associated with the handover parameters as described above with reference to FIG. 3. The service support module 610 may also identify a number of services supported by the mobile device as described above with reference to FIG. 3.

The mobile device characteristic module 615 may identify a number of characteristics of the mobile device as described above with reference to FIG. 3. In some examples, the characteristics of the mobile device comprise a mobile device model.

Figure 7A:
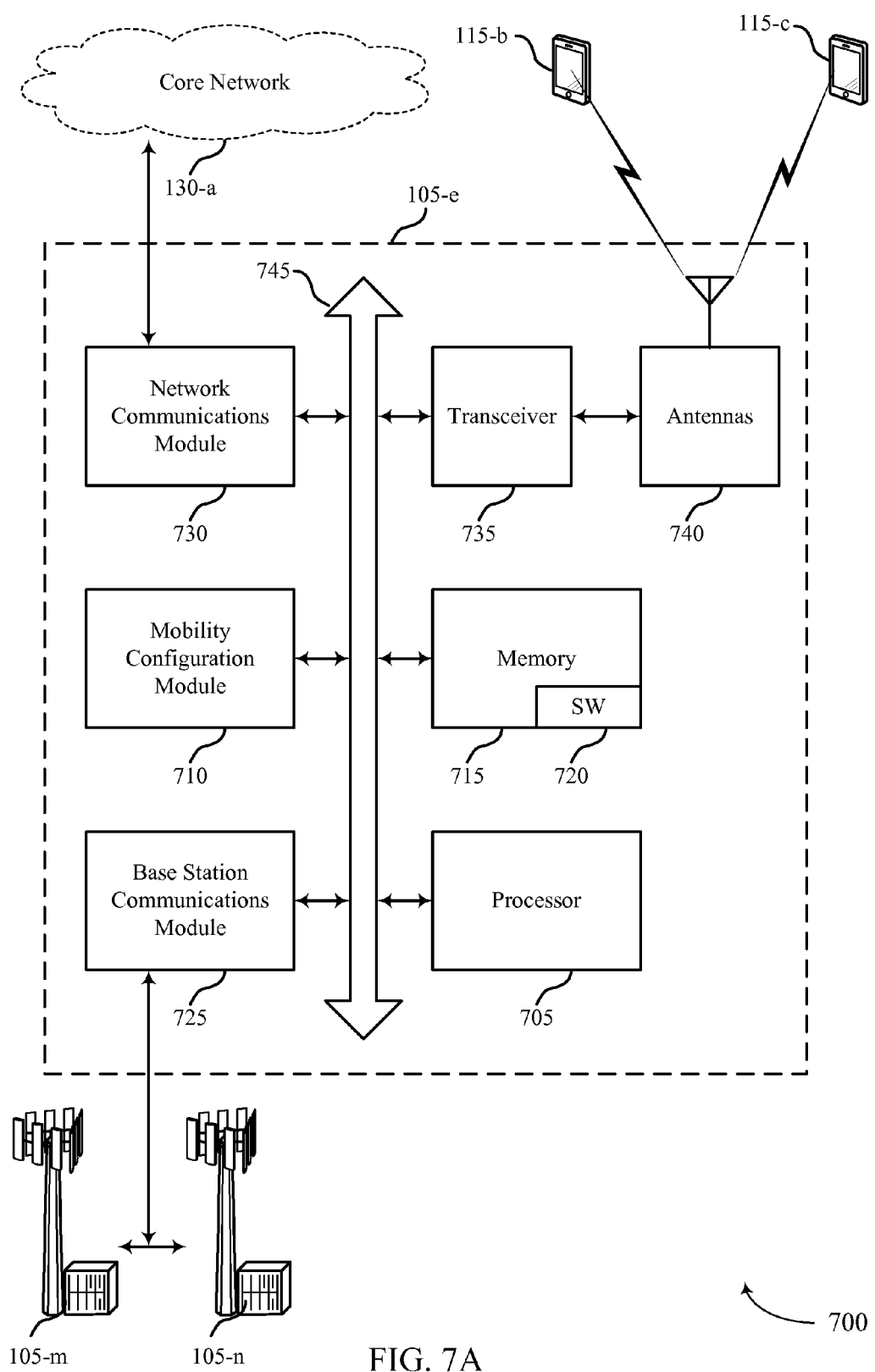
FIG. 7A illustrates a block diagram of a system for LTE handover parameter configuration for specific types of traffic in accordance with various aspects of the present disclosure.

FIG. 7A illustrates a block diagram of a system 700 for LTE handover parameter configuration for specific types of traffic in accordance with various aspects of the present disclosure. System 700 may include an example of a base station 105 as described above with reference to FIGS. 1-6. The base station 105-d may include components for bi-directional voice and data communications including components for transmitting communications and components for receiving communications. For example, base station 105-*d* may be in communication with UEs 115-*b* and 115-*c*, at least one of which may be undergoing a handover procedure.

In some cases, the base station 105-*d* may have one or more wired backhaul links. The base station 105-*d* may have a wired backhaul link (e.g., S1 interface, etc.) to the core network 130. The base station 105-*d* may also communicate with other base stations 105, such as base station 105-*m* and base station 105-*n* via inter-base station communication links (e.g., X2 interface, etc.). Each of the base stations 105 may communicate with UEs 115 using the same or different wireless communications technologies. In some cases, base station 105-*d* may communicate with other base stations such as 105-*m* and/or 105-*n* utilizing base station communications module 725. In some embodiments, base station communications module 725 may provide an X2 interface within an LTE/LTE-A wireless communication network technology to provide communication between some of the base stations 105. In some embodiments, base station 105-*d* may communicate with other base stations through core network 130. In some cases, base station 105-*d* may communicate with the core network 130 through network communications module 730.

The base station 105-*d* may include, a processor module 705, memory 715 (including software (SW) 720), transceiver modules 735, and antenna(s) 740, which each may be in communication, directly or indirectly, with each other (e.g., over bus system 745). The transceiver modules 735 may be configured to communicate bi-directionally, via the antenna(s) 740, with the UEs 115, which may be multi-mode devices. The transceiver module 735 (and/or other components of the base station 105-*d*) may also be configured to communicate bi-directionally, via the antennas 740, with one or more other base stations (not shown). The transceiver module 735 may include a modem configured to modulate the packets and provide the modulated packets to the antennas 740 for transmission, and to demodulate packets received from the antennas 740. The base station 105-*d* may include multiple transceiver modules 735, each with one or more associated antennas 740. The transceiver module may be an example of a combined receiver 405 and transmitter 415 of FIG. 4.

The memory 715 may include random access memory (RAM) and read-only memory (ROM). The memory 715 may also store computer-readable, computer-executable software code 720 containing instructions that are configured to, when executed, cause the processor module 710 to perform various functions described herein (e.g., adaptively selecting handover parameters based on traffic type, etc.). Alternatively, the software 720 may not be directly executable by the processor module 705 but be configured to cause the computer, e.g., when compiled and executed, to perform functions described herein.

The processor module 705 may include an intelligent hardware device, e.g., a central processing unit (CPU), a microcontroller, an application-specific integrated circuit (ASIC), etc. The processor module 705 may include various special purpose processors such as encoders, queue processing modules, base band processors, radio head controllers, digital signal processors (DSPs), and the like.

The base station communications module 725 may manage communications with other base stations 105. The base station communications module 725 may include a controller and/or scheduler for controlling communications with UEs 115 in cooperation with other base stations 105. For example, the base station communications module 725 may coordinate scheduling for transmissions to UEs 115 for various interference mitigation techniques such as beamforming and/or joint transmission.

Figure 7B:
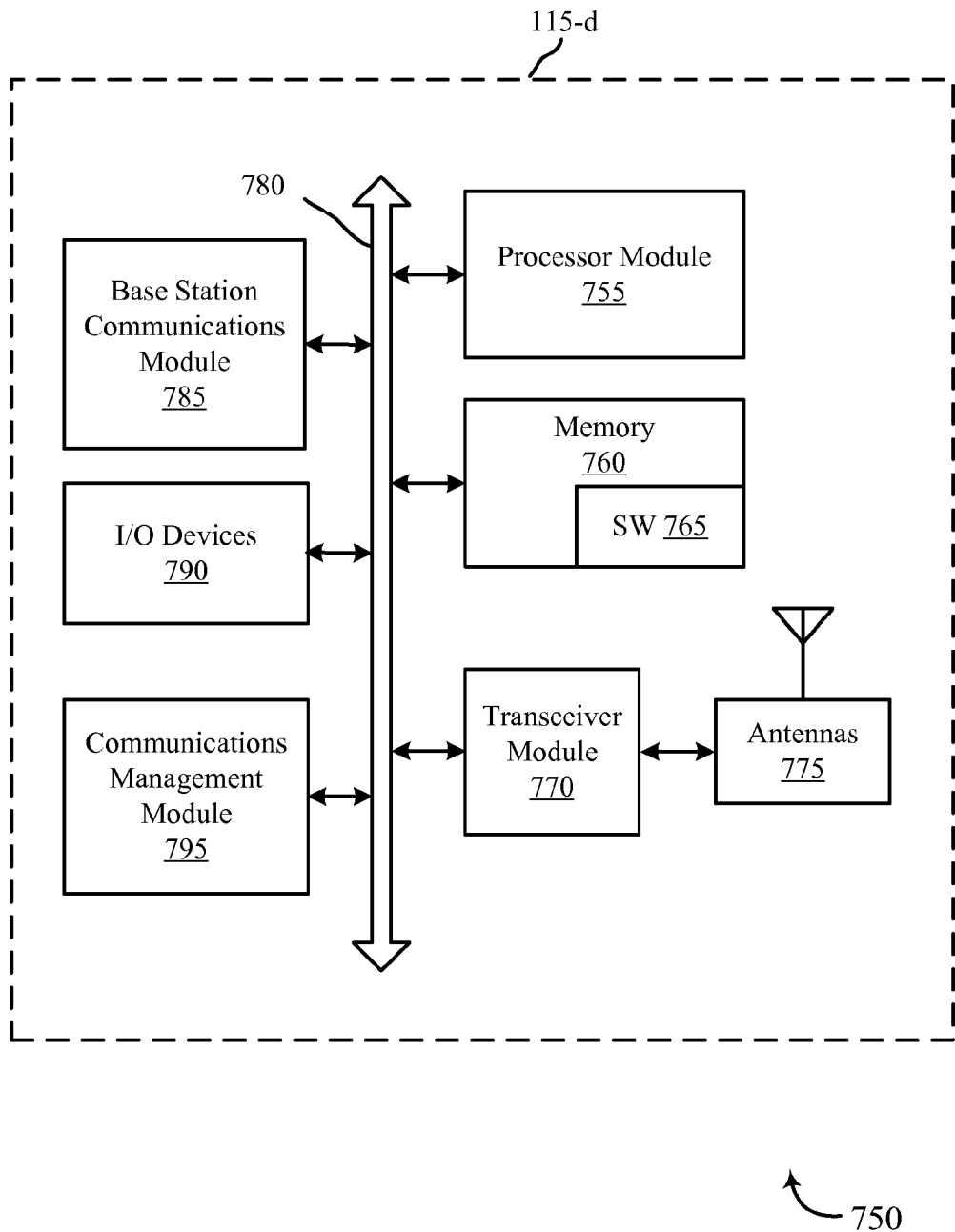
FIG. 7B shows a system for use in wireless communication, in accordance with various examples.

FIG. 7B shows a system 750 for use in wireless communication, in accordance with various examples. System 750 may include a UE 115-*d*, which may be an example of the UEs 115 of FIGS. 1, 2, and/or 7A.

The UE 115-*d* may generally include components for bi-directional voice and data communications including components for transmitting communications and components for receiving communications. The UE 115-*d* may include antenna(s) 775, a transceiver module 770, a processor module 755, memory 760 (including software (SW) 765), one or more input/output (I/O) devices 790, and a communications management module 795, which each may communicate, directly or indirectly, with each other (e.g., via one or more buses 780). The transceiver module 770 may be configured to communicate bi-directionally, via the antenna(s) 775 and/or one or more wired or wireless links, with one or more networks, as described above. For example, the transceiver module 770 may be configured to communicate bi-directionally with base stations 105 with reference to FIGS. 1, 2, 4, 5, 6, and/or 7A. The transceiver module 770 may include a modem configured to modulate the packets and provide the modulated packets to the antenna(s) 775 for transmission, and to demodulate packets received from the antenna(s) 775. While the UE 115-*d* may include a single antenna 775, the UE 115-*d* may have multiple antennas 775 capable of concurrently transmitting and/or receiving multiple wireless transmissions. The transceiver module 770 may be capable of concurrently communicating with one or more base stations 105 via multiple component carriers.

The memory 760 may include random access memory (RAM) and read-only memory (ROM). The memory 760 may store computer-readable, computer-executable software/firmware code 765 containing instructions that are configured to, when executed, cause the processor module 755 to perform various functions described herein. Alternatively, the computer-readable, computer-executable software/firmware code 765 may not be directly executable by the processor module 755 but be configured to cause a computer (e.g., when compiled and executed) to perform functions described herein. The processor module 755 may include an intelligent hardware device, e.g., a central processing unit (CPU), a microcontroller, an application-specific integrated circuit (ASIC), etc. The UE 115-*d* may also include a base station communications module 785. The processor module 755 may process information to be sent to the transceiver module(s) 770 for transmission through the antenna(s) 775, to the base station communications module 785, for transmission to one or more other base stations 105.

The one or more input/output (I/O) devices 790 may include one or more devices for receiving user input (e.g., buttons, keyboard, mouse, track-pad, touch-screen, microphone, etc.), sensing information (e.g., Global Positioning System (GPS) devices, gyroscopes, accelerometers, piezoelectric sensors, etc.), providing output to a user (e.g., display devices, speakers, motors, actuators, etc.), and/or other communication interfaces (e.g., infra-red communication devices, near-field communications (NFC) devices, etc.).

The communications management module 795 may manage or otherwise control various communication operations of the UE 115-*d*, such as according to various radio protocols including operation on LTE/LTE-A networks.

Figure 8:
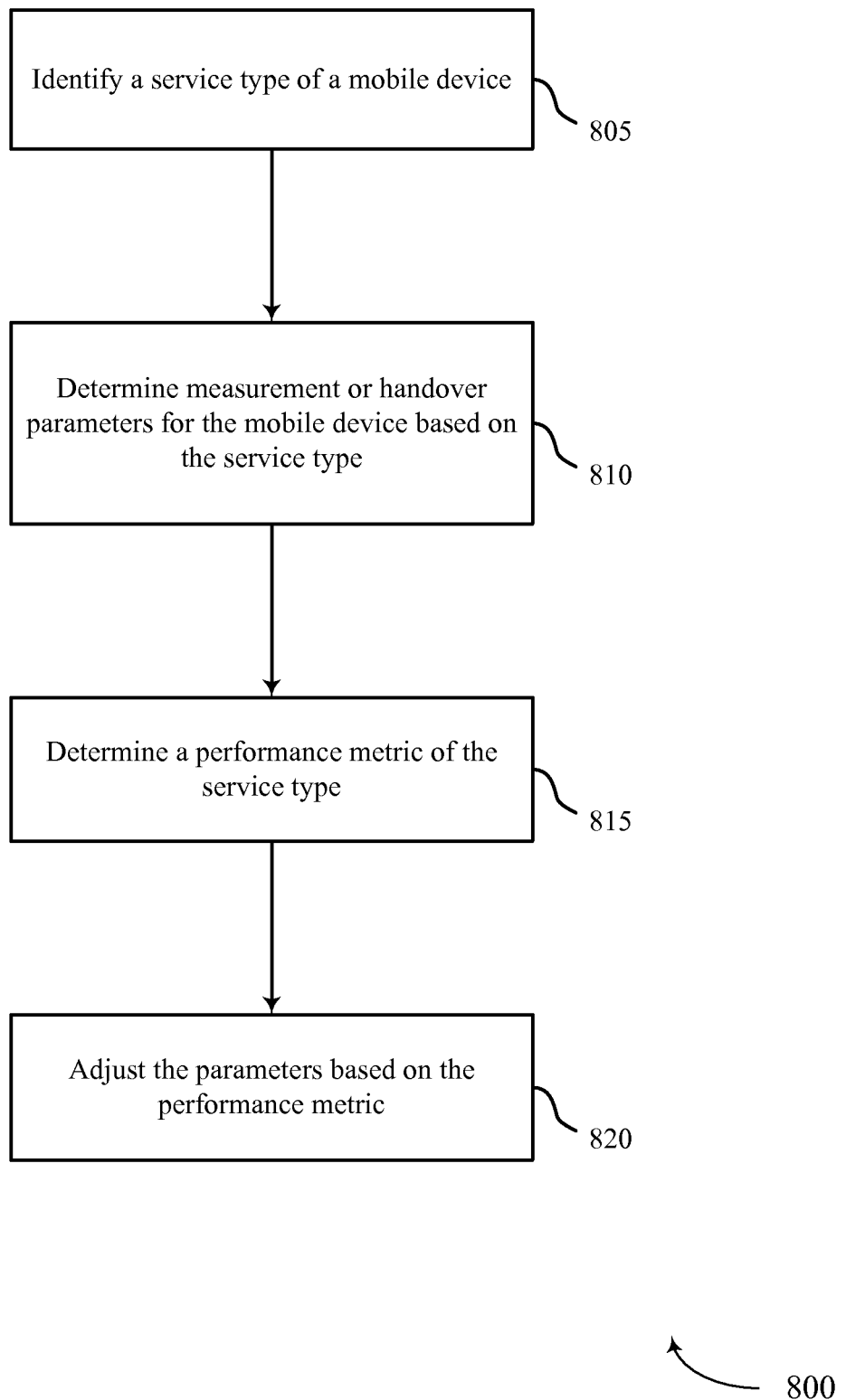
FIG. 8 shows a flowchart illustrating a method for LTE handover parameter configuration for specific types of traffic in accordance with various aspects of the present disclosure.

FIG. 8 shows a flowchart illustrating a method 800 for LTE handover parameter configuration for specific types of traffic in accordance with various aspects of the present disclosure. The operations of method 800 may be implemented by a base station 105 or one or more of its components as described with reference to FIGS. 1-7. In certain examples, one or more of the operations of method 800 may be performed by the mobility configuration module 410 as described with reference to FIGS. 4-7. In some examples, a base station 105 may execute one or more sets of codes to control the functional elements of the base station 105 to perform the functions described below. Additionally or alternatively, the base station 105 may perform one or more of the functions described below using special-purpose hardware.

At block 805, the base station 105 may identify a service type of a mobile device as described above with reference to FIG. 3. In certain examples, the operation(s) of block 805 may be performed by the service type identification module 505 as described above with reference to FIG. 5.

At block 810, the base station 105 may determine a set of parameters for the mobile device based at least in part on the service type, wherein the set of parameters comprises measurement parameters or handover parameters as described above with reference to FIG. 3. In certain examples, the operation(s) of block 810 may be performed by the parameter identification module 510 as described above with reference to FIG. 5.

At block 815, the base station 105 may determine a performance metric of the service type as described above with reference to FIG. 3. In certain examples, the operation(s) of block 815 may be performed by the performance metric module 515 as described above with reference to FIG. 5.

At block 820, the base station 105 may adjust the set of parameters based at least in part on the performance metric as described above with reference to FIG. 3. In certain examples, the operation(s) of block 820 may be performed by the parameter adjustment module 520 as described above with reference to FIG. 5.

Figure 9:
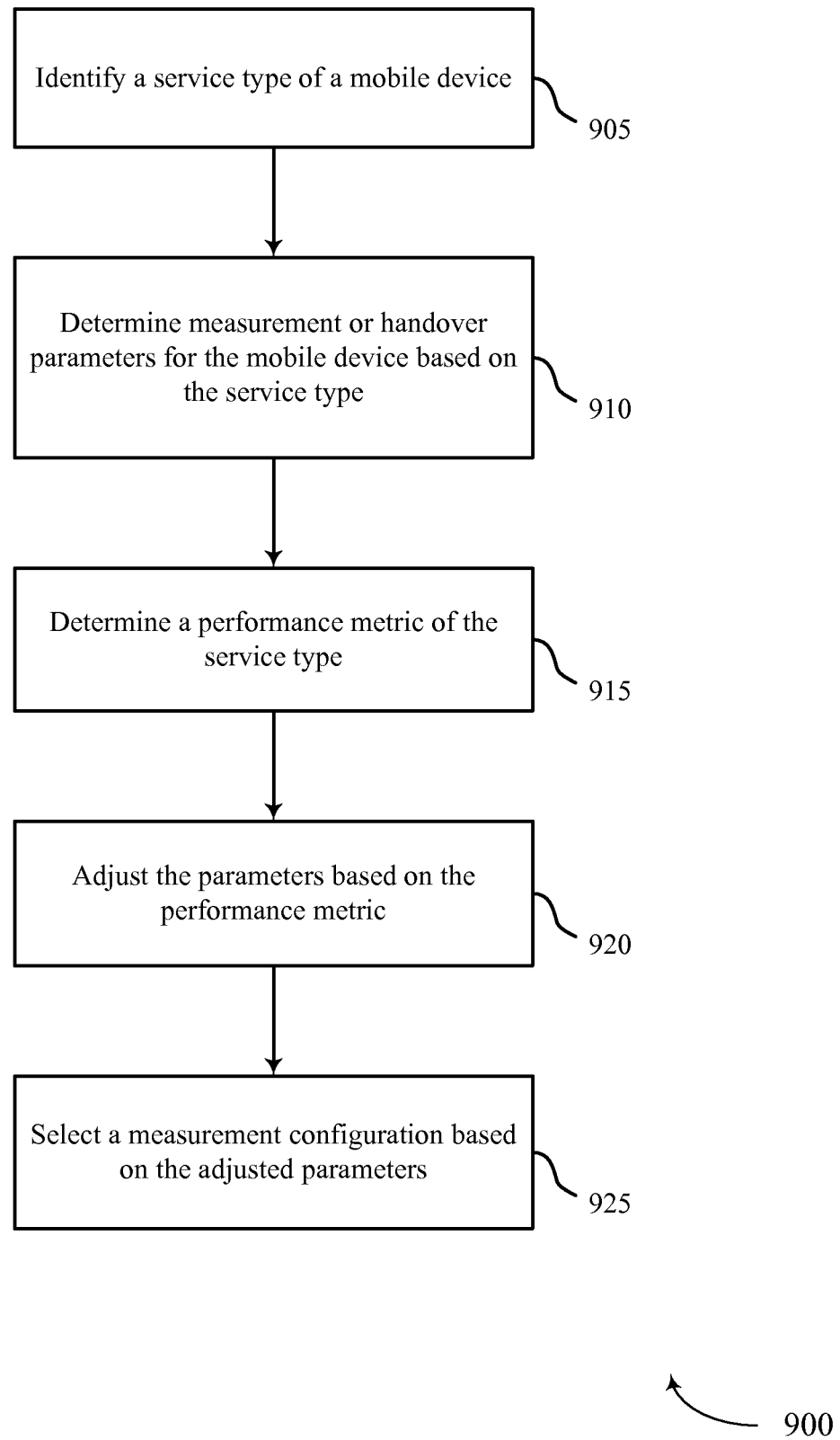
FIG. 9 shows a flowchart illustrating a method for LTE handover parameter configuration for specific types of traffic in accordance with various aspects of the present disclosure.

FIG. 9 shows a flowchart illustrating a method 900 for LTE handover parameter configuration for specific types of traffic in accordance with various aspects of the present disclosure. The operations of method 900 may be implemented by a base station 105 or one or more of its components as described with reference to FIGS. 1-7. In certain examples, one or more of the operations of method 900 may be performed by the mobility configuration module 410 as described with reference to FIGS. 4-7. In some examples, a base station 105 may execute one or more sets of codes to control the functional elements of the base station 105 to perform the functions described below. Additionally or alternatively, the base station 105 may perform one or more of the functions described below using special-purpose hardware. The method 900 may also incorporate aspects of method 800 of FIG. 8.

At block 905, the base station 105 may identify a service type of a mobile device as described above with reference to FIG. 3. In certain examples, the operation(s) of block 905 may be performed by the service type identification module 505 as described above with reference to FIG. 5.

At block 910, the base station 105 may determine a set of parameters for the mobile device based at least in part on the service type, wherein the set of parameters comprises measurement parameters or handover parameters as described above with reference to FIG. 3. In certain examples, the operation(s) of block 910 may be performed by the parameter identification module 510 as described above with reference to FIG. 5.

At block 915, the base station 105 may determine a performance metric of the service type as described above with reference to FIG. 3. In certain examples, the operation(s) of block 915 may be performed by the performance metric module 515 as described above with reference to FIG. 5.

At block 920, the base station 105 may adjust the set of parameters based at least in part on the performance metric as described above with reference to FIG. 3. In certain examples, the operation(s) of block 920 may be performed by the parameter adjustment module 520 as described above with reference to FIG. 5.

At block 925, the base station 105 may select a measurement configuration based on the adjusted set of parameters as described above with reference to FIG. 3. In certain examples, the operation(s) of block 925 may be performed by the measurement configuration module 605 as described above with reference to FIG. 6.

Figure 10:
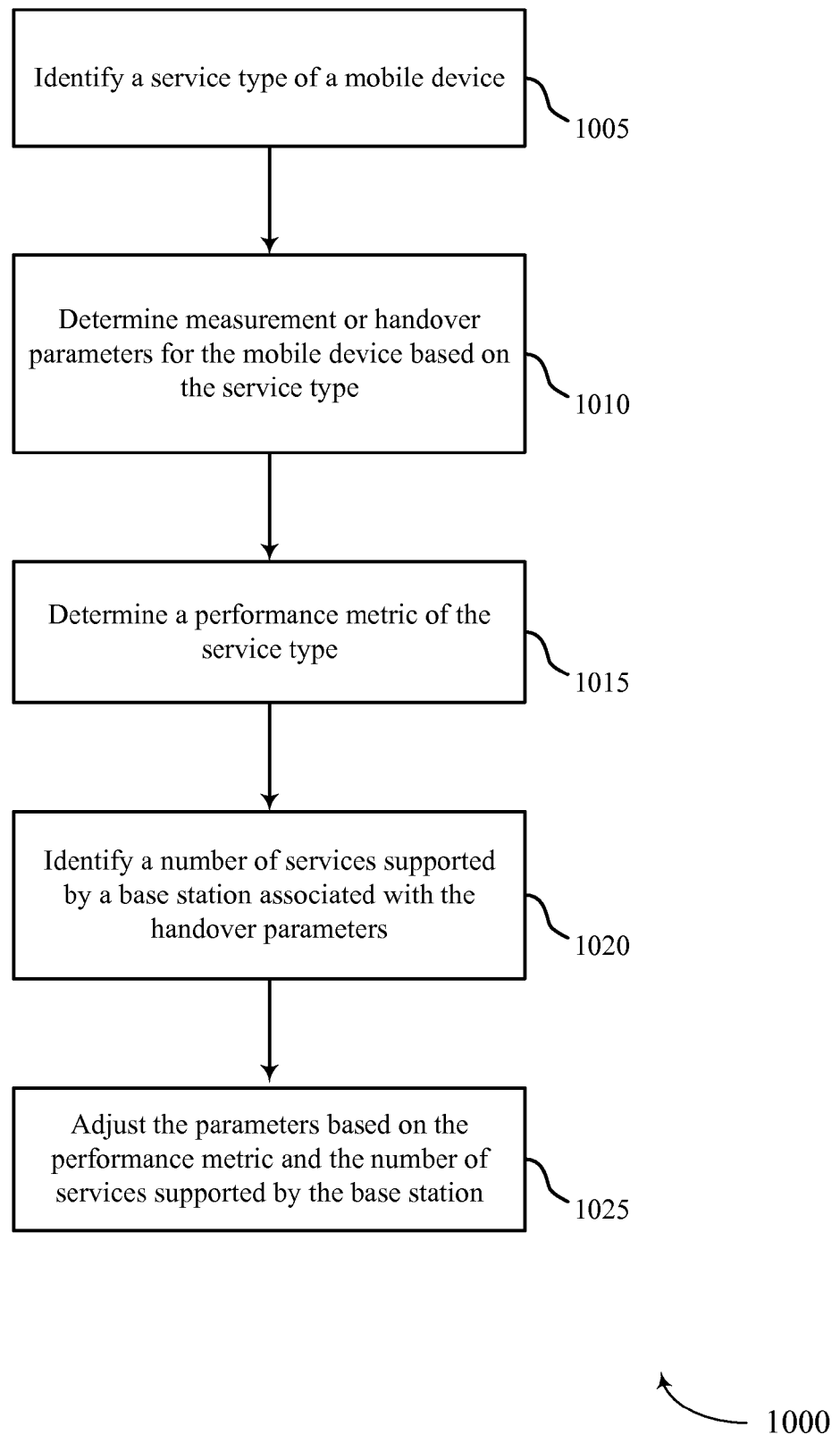
FIG. 10 shows a flowchart illustrating a method for LTE handover parameter configuration for specific types of traffic in accordance with various aspects of the present disclosure.

FIG. 10 shows a flowchart illustrating a method 1000 for LTE handover parameter configuration for specific types of traffic in accordance with various aspects of the present disclosure. The operations of method 1000 may be implemented by a base station 105 or one or more of its components as described with reference to FIGS. 1-7. In certain examples, one or more of the operations of method 1000 may be performed by the mobility configuration module 410 as described with reference to FIGS. 4-7. In some examples, a base station 105 may execute one or more sets of codes to control the functional elements of the base station 105 to perform the functions described below. Additionally or alternatively, the base station 105 may perform one or more of the functions described below using special-purpose hardware. The method 1000 may also incorporate aspects of methods 800, and 900 of FIGS. 8-9.

At block 1005, the base station 105 may identify a service type of a mobile device as described above with reference to FIG. 3. In certain examples, the operation(s) of block 1005 may be performed by the service type identification module 505 as described above with reference to FIG. 5.

At block 1010, the base station 105 may determine a set of parameters for the mobile device based at least in part on the service type, wherein the set of parameters comprises measurement parameters or handover parameters as described above with reference to FIG. 3. In certain examples, the operation(s) of block 1010 may be performed by the parameter identification module 510 as described above with reference to FIG. 5.

At block 1015, the base station 105 may determine a performance metric of the service type as described above with reference to FIG. 3. In certain examples, the operation(s) of block 1015 may be performed by the performance metric module 515 as described above with reference to FIG. 5.

At block 1020, the base station 105 may identify a number of services supported by a base station associated with the handover parameters as described above with reference to FIG. 3. In certain examples, the operation(s) of block 1020 may be performed by the service support module 610 as described above with reference to FIG. 6.

At block 1025, the base station 105 may adjust the set of parameters based at least in part on the performance metric and the number of services supported by the base station as described above with reference to FIG. 3. In certain examples, the operation(s) of block 1025 may be performed by the parameter adjustment module 520 as described above with reference to FIG. 5.

Figure 11:
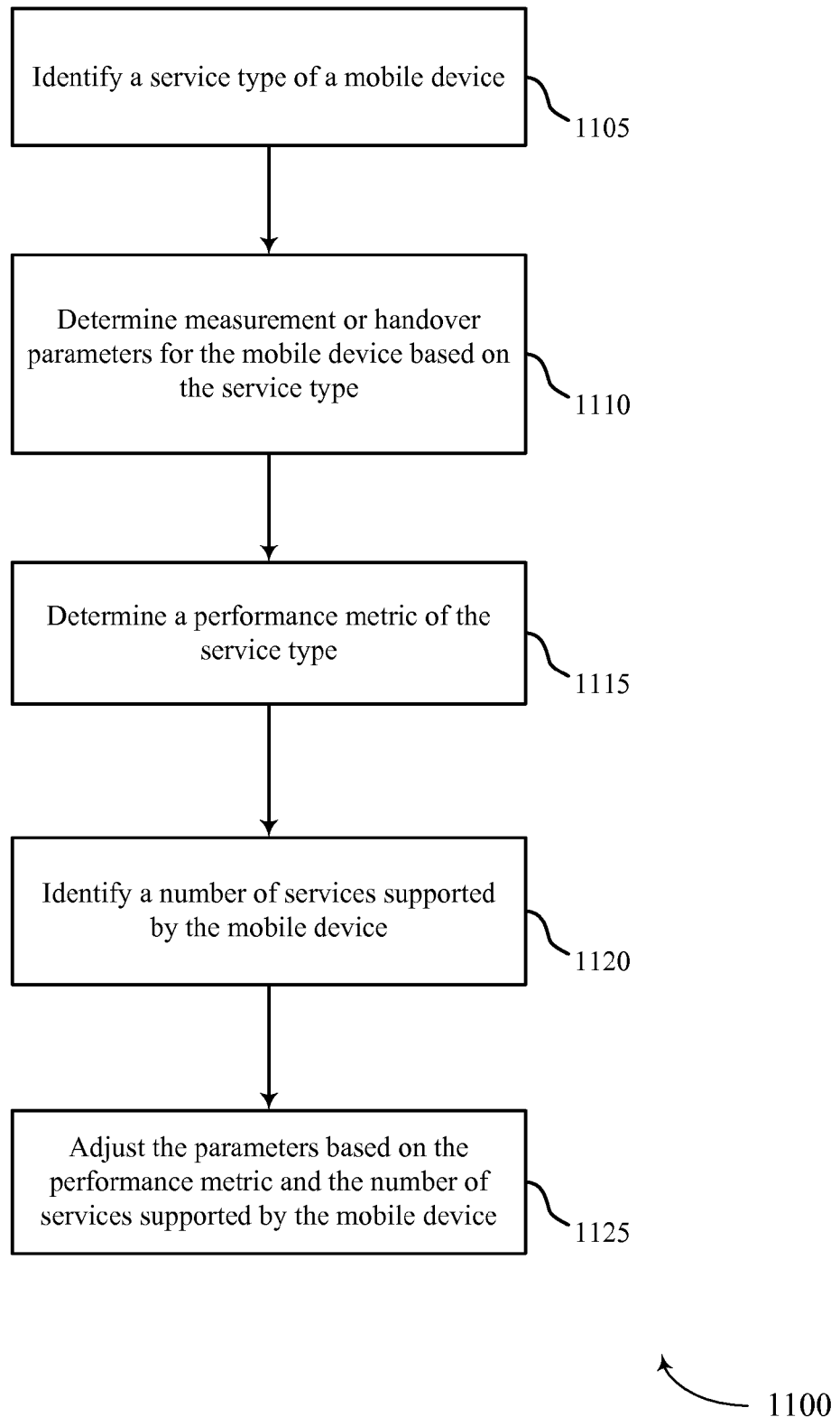
FIG. 11 shows a flowchart illustrating a method for LTE handover parameter configuration for specific types of traffic in accordance with various aspects of the present disclosure.

FIG. 11 shows a flowchart illustrating a method 1100 for LTE handover parameter configuration for specific types of traffic in accordance with various aspects of the present disclosure. The operations of method 1100 may be implemented by a base station 105 or one or more of its components as described with reference to FIGS. 1-7. In certain examples, one or more of the operations of method 1100 may be performed by the mobility configuration module as described with reference to FIGS. 4-7. In some examples, a base station 105 may execute one or more sets of codes to control the functional elements of the base station 105 to perform the functions described below. Additionally or alternatively, the base station 105 may perform one or more of the functions described below using special-purpose hardware. The method 1100 may also incorporate aspects of methods 800, 900, and 1000 of FIGS. 8-10.

At block 1105, the base station 105 may identify a service type of a mobile device as described above with reference to FIG. 3. In certain examples, the operation(s) of block 1105 may be performed by the service type identification module 505 as described above with reference to FIG. 5.

At block 1110, the base station 105 may determine a set of parameters for the mobile device based at least in part on the service type, wherein the set of parameters comprises measurement parameters or handover parameters as described above with reference to FIG. 3. In certain examples, the operation(s) of block 1110 may be performed by the parameter identification module 510 as described above with reference to FIG. 5.

At block 1115, the base station 105 may determine a performance metric of the service type as described above with reference to FIG. 3. In certain examples, the operation(s) of block 1115 may be performed by the performance metric module 515 as described above with reference to FIG. 5.

At block 1120, the base station 105 may identify a number of services supported by the mobile device as described above with reference to FIG. 3. In certain examples, the operation(s) of block 1120 may be performed by the service support module 610 as described above with reference to FIG. 6.

At block 1125, the base station 105 may adjust the set of parameters based at least in part on the performance metric and the number of services supported by the mobile device as described above with reference to FIG. 3. In certain examples, the operation(s) of block 1125 may be performed by the parameter adjustment module 520 as described above with reference to FIG. 5.

Figure 12:
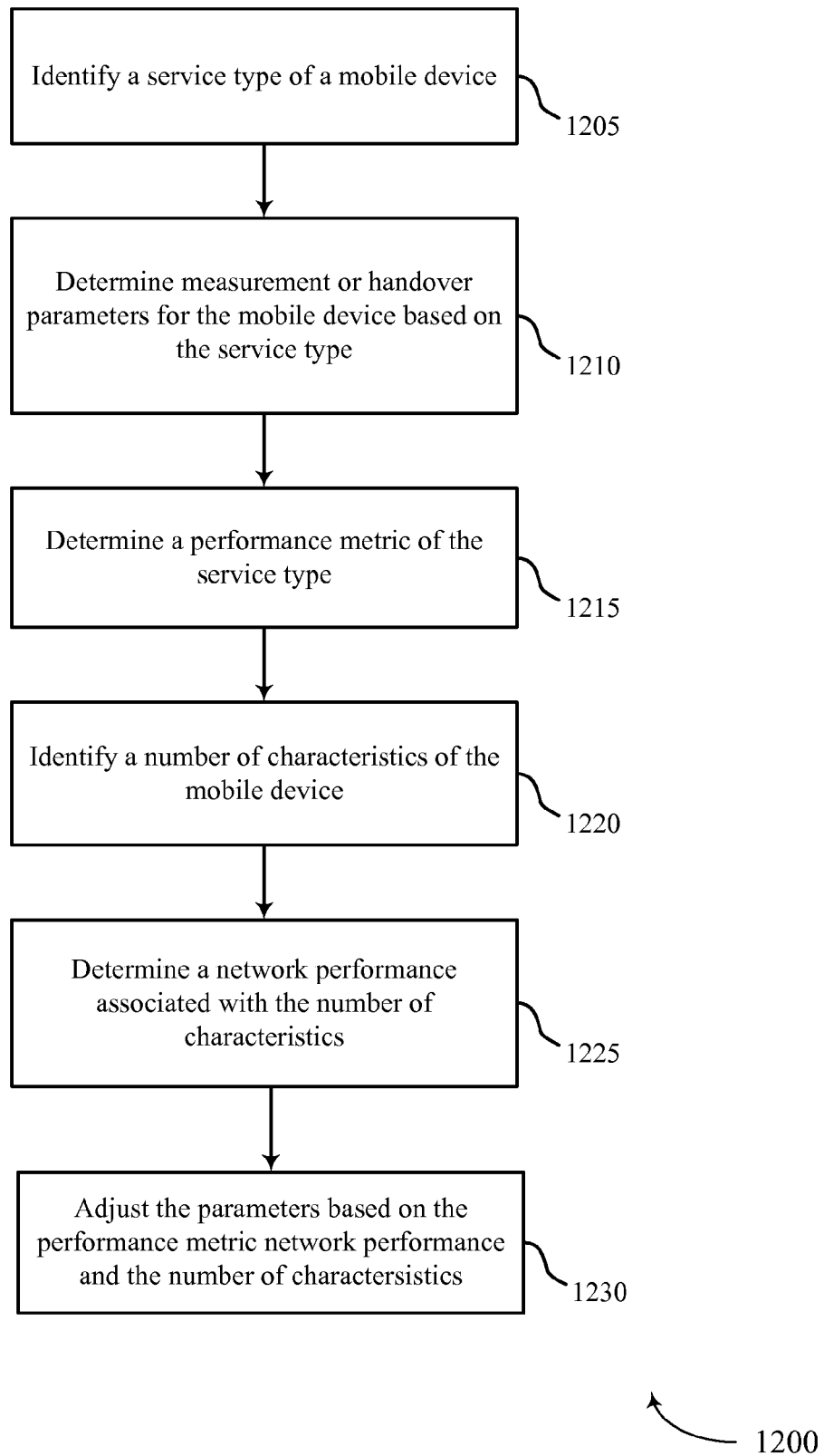
FIG. 12 shows a flowchart illustrating a method for LTE handover parameter configuration for specific types of traffic in accordance with various aspects of the present disclosure.

FIG. 12 shows a flowchart illustrating a method 1200 for LTE handover parameter configuration for specific types of traffic in accordance with various aspects of the present disclosure. The operations of method 1200 may be implemented by a base station 105 or one or more of its components as described with reference to FIGS. 1-7. In certain examples, one or more of the operations of method 1200 may be performed by the mobility configuration module as described with reference to FIGS. 4-7. In some examples, a base station 105 may execute one or more sets of codes to control the functional elements of the base station 105 to perform the functions described below. Additionally or alternatively, the base station 105 may perform one or more of the functions described below using special-purpose hardware. The method 1200 may also incorporate aspects of methods 800, 900, 1000, and 1100 of FIGS. 8-11.

At block 1205, the base station 105 may identify a service type of a mobile device as described above with reference to FIG. 3. In certain examples, the operation(s) of block 1205 may be performed by the service type identification module 505 as described above with reference to FIG. 5.

At block 1210, the base station 105 may determine a set of parameters for the mobile device based at least in part on the service type, wherein the set of parameters comprises measurement parameters or handover parameters as described above with reference to FIG. 3. In certain examples, the operation(s) of block 1210 may be performed by the parameter identification module 510 as described above with reference to FIG. 5.

At block 1215, the base station 105 may determine a performance metric of the service type as described above with reference to FIG. 3. In certain examples, the operation(s) of block 1215 may be performed by the performance metric module 515 as described above with reference to FIG. 5.

At block 1220, the base station 105 may identify a number of characteristics of the mobile device as described above with reference to FIG. 3. In certain examples, the operation(s) of block 1220 may be performed by the mobile device characteristic module 615 as described above with reference to FIG. 6.

At block 1225, the base station 105 may determine a network performance associated with the number of characteristics of the mobile device as described above with reference to FIG. 3. In certain examples, the operation(s) of block 1225 may be performed by the performance metric module 515 as described above with reference to FIG. 5.

At block 1230, the base station 105 may adjust the set of parameters based at least in part on the performance metric and the network performance as described above with reference to FIG. 3. In certain examples, the operation(s) of block 1230 may be performed by the parameter adjustment module 520 as described above with reference to FIG. 5.

Thus, methods 800, 900, 1000, 1100, and 1200 may provide for LTE handover parameter configuration for specific types of traffic. It should be noted that methods 800, 900, 1000, 1100, and 1200 describe possible implementation, and that the operations and the steps may be rearranged or otherwise modified such that other implementations are possible. In some examples, aspects from two or more of the methods 800, 900, 1000, 1100, and 1200 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a base station, comprising:
    identifying a service type including a quality of service (QoS) class identifier (QCI) of a mobile device;
    determining a set of handover parameters for the mobile device based at least in part on the service type and QCI;
    determining a current performance metric associated with the identified service type and QCI;
    adjusting the set of handover parameters based at least in part on the determined current performance metric; and
    transmitting, to the mobile device, a mobility message based at least in part on the adjusted set of handover parameters.

2. The method of claim 1, further comprising:
    selecting a measurement configuration based at least in part on the adjusted set of handover parameters.

3. The method of claim 2, further comprising:
    excluding a parameter from the measurement configuration based at least in part on the determined current performance metric.

4. The method of claim 1, further comprising:
    selecting a handover target based at least in part on the determined current performance metric.

5. The method of claim 1, further comprising:
identifying a number of services supported by the base station associated with the set of handover parameters.

6. The method of claim 5, wherein adjusting the set of handover parameters comprises:
adjusting the set of handover parameters based at least in part on the determined current performance metric and the number of services supported by the base station.

7. The method of claim 1, further comprising:
identifying a number of services supported by the mobile device.

8. The method of claim 7, wherein adjusting the set of handover parameters comprises:
adjusting the set of handover parameters based at least in part on the determined current performance metric and the number of services supported by the mobile device.

9. The method of claim 1, further comprising:
identifying a number of characteristics of the mobile device.

10. The method of claim 9, further comprising:
determining a network performance associated with the number of characteristics of the mobile device.

11. The method of claim 9, wherein adjusting the set of handover parameters comprises:
adjusting the set of handover parameters based at least in part on the determined current performance metric and the number of characteristics of the mobile device.

12. The method of claim 9, wherein the number of characteristics of the mobile device comprise a mobile device model.

13. The method of claim 1, wherein the determined current performance metric comprises at least one of: intra-frequency handover counts, inter-frequency handover counts, ping-pongs, inter radio access technology (RAT) triggers, single radio voice call continuity (SR-VCC) triggers, radio resource control (RRC) connection reestablishment occurrences, robust header compression (RoHC) related efficiency, RoHC related mode changes, block error rate (BLER), physical downlink shared channel (PDSCH)/physical uplink shared channel (PUSCH) resource block utilization, physical downlink control channel (PDCCH) utilization, a number of users per service type, or a combination thereof.

14. An apparatus for wireless communication at a base station, comprising:
means for identifying a service type including a quality of service (QoS) class identifier (QCI) of a mobile device;
means for determining a set of handover parameters for the mobile device based at least in part on the service type and QCI;
means for determining a current performance metric associated with the identified service type and QCI;
means for adjusting the set of handover parameters based at least in part on the determined current performance metric; and
means for transmitting, to the mobile device, a mobility message based at least in part on the adjusted set of handover parameters.

15. The apparatus of claim 14, further comprising:
means for selecting a measurement configuration based at least in part on the adjusted set of handover parameters.

16. The apparatus of claim 15, further comprising:
means for excluding a parameter from the measurement configuration based at least in part on the determined current performance metric.

17. The apparatus of claim 14, further comprising:
means for selecting a handover target based at least in part on the determined current performance metric.

18. The apparatus of claim 14, further comprising:
means for identifying a number of services supported by the base station associated with the set of handover parameters.

19. The apparatus of claim 18, wherein means for adjusting the set of handover parameters comprises:
means for adjusting the set of handover parameters based at least in part of the determined current performance metric and the number of services supported by the base station.

20. The apparatus of claim 14, further comprising:
means for identifying a number of services supported by the mobile device.

21. The apparatus of claim 20, wherein means for adjusting the set of handover parameters comprises:
means for adjusting the set of handover parameters based at least in part on the determined current performance metric and the number of services supported by the mobile device.

22. The apparatus of claim 14, further comprising:
means for identifying a number of characteristics of the mobile device.

23. The apparatus of claim 22, further comprising:
means for determining a network performance associated with the number of characteristics of the mobile device.

24. The apparatus of claim 22, wherein means for adjusting the set of handover parameters comprises:
means for adjusting the set of handover parameters based at least in part of the determined current performance metric and the number of characteristics of the mobile device.

25. The apparatus of claim 22, wherein the number of characteristics of the mobile device comprise a mobile device model.

26. The apparatus of claim 14, wherein the determined current performance metric comprises at least one of: intra-frequency handover counts, inter-frequency handover counts, ping-pongs, inter radio access technology (RAT) triggers, single radio voice call continuity (SR-VCC) triggers, radio resource control (RRC) connection reestablishment occurrences, robust header compression (RoHC) related efficiency, RoHC related mode changes, block error rate (BLER), physical downlink shared channel (PDSCH)/physical uplink shared channel (PUSCH) resource block utilization, physical downlink control channel (PDCCH) utilization, a number of users per service type, or a combination thereof.

27. An apparatus for wireless communication at a base station, comprising a processor, a memory in electronic communication with the processor and instructions stored in the memory, wherein the instructions are executable by the processor to:
identify a service type including a quality of service (QoS) class identifier (QCI) of a mobile device;
determine a set of handover parameters for the mobile device based at least in part on the service type and QCI;
determine a current performance metric associated with the identified service type and QCI;
adjust the set of handover parameters based at least in part on the determined current performance metric; and
transmit, to the mobile device, a mobility message based on the adjusted set of handover parameters.

28. A non-transitory computer-readable medium storing code for wireless communication at a base station, the code comprising instructions executable by a processor to:
- identify a service type including a quality of service (QoS) class identifier (QCI) of a mobile device;
- determine a set of handover parameters for the mobile device based at least in part on the service type and QCI;
- determine a current performance metric associated with the identified service type and QCI;
- adjust the set of handover parameters based at least in part on the determined current performance metric; and
- transmit, to the mobile device, a mobility message based on the adjusted set of handover parameters.

* * * * *